Nov. 17, 1970 R. C. BRACKEN 3,540,919
RECONSTITUTION OF CHEMICAL VAPOR DEPOSITION STREAM
Filed Sept. 8, 1966
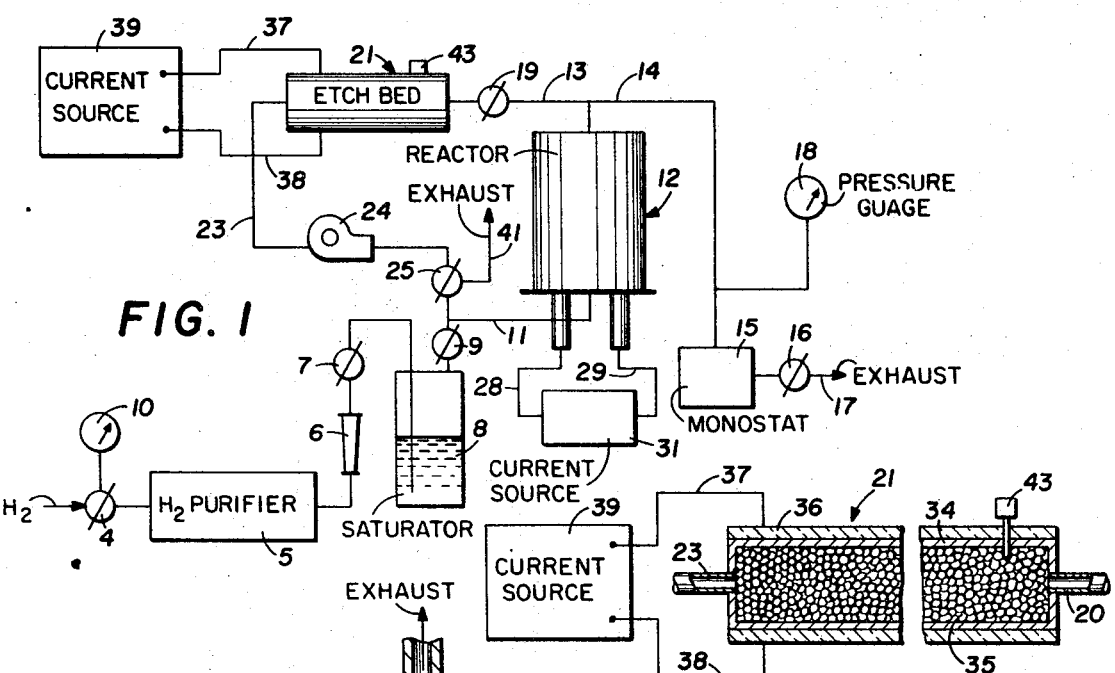
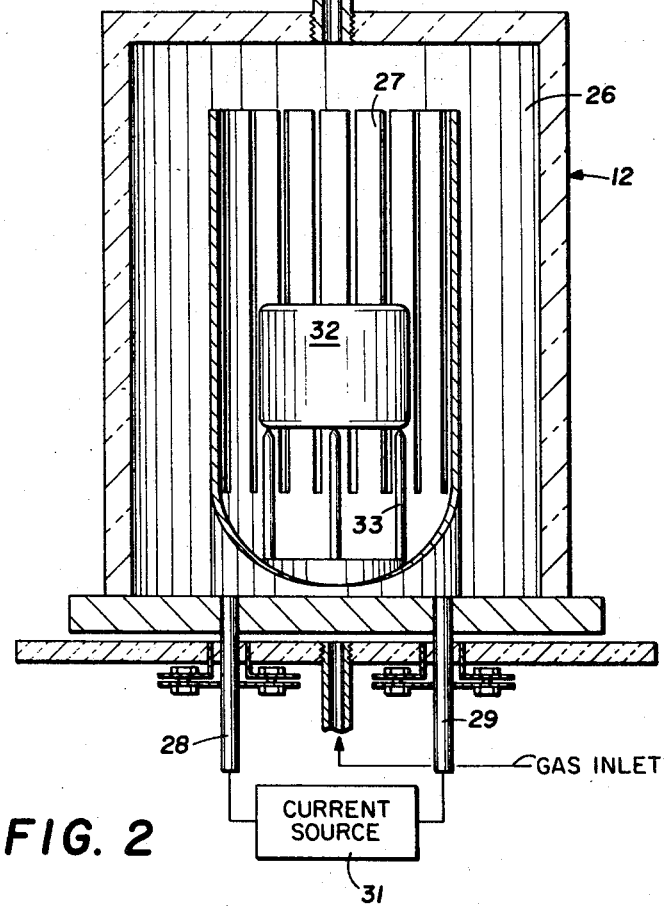
INVENTOR
RONALD C. BRACKEN
V. Bryan Medlock, Jr.
ATTORNEY United States Patent Office 3,540,919
Patented Nov. 17, 1970

1

3,540,919
RECONSTITUTION OF CHEMICAL VAPOR
DEPOSITION STREAM
Ronald C. Bracken, Richardson, Tex., assignor to Texas
Instruments Incorporated, Dallas, Tex., a corporation
of Delaware
Filed Sept. 8, 1966, Ser. No. 577,969
Int. Cl. C23c *11/00*
U.S. Cl. 117—102                              5 Claims

ABSTRACT OF THE DISCLOSURE

In a process for the vapor deposition of silicon from a gaseous mixture containing silicon tetrachloride and hydrogen, the off-gases from the deposition zone are reconstituted for recycle by passing such effluent in contact with a particulate mass of silicon at conditions suitable for etching the silicon, thereby restoring the silicon content of the gaseous stream to a level suitable for recycle to the deposition zone. Silicon compounds other than $SiCl_4$ may be used in the same process. Also, processes for depositing chromium, titanium, zirconium or vanadium are improved by the same technique for reconstitution and recycle of off-gas streams.

---

This invention relates to chemical vapor deposition, and more particularly, but not by way of limitation, to a method for reconstituting the concentration of a component in a gas stream after vapor deposition of said component from the stream.

Various chemical materials can be manufactured by reducing a halide, hydride or halohydride of the material in the presence of a hydrogen at elevated temperature. This technique is termed by those skilled in the art as a chemical vapor deposition technique and may be used to either produce a pure or relatively pure material or deposit a desired material on the surface of a substrate.

For example, both silicon tetrachloride ($SiCl_4$) and trichlorosilane ($SiHCl_3$) are now used in the manufacturing of silicon. Trichlorosilane and silicon tetrachloride will react with hydrogen at elevated temperatures to produce silicon with reasonable efficiencies and rates. While the overall reactions can be written as:

$$SiCl_4 + 2H_2 \rightarrow 4HCl + Si \quad (1)$$

$$SiHCl_3 + H_2 \rightarrow 3HCl + Si \quad (2)$$

these are gross simplifications. For example, in reaction (1), considerable $SiHCl_3$, $SiCl_2$, and long chain polymers occur as well as HCl and silicon, and reaction (2) probably proceeds as:

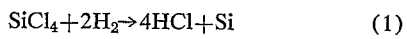

$$SiHCl_3 \rightarrow SiCl_2 + HCl + \text{Dichloride Polymers} \quad (3)$$

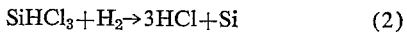

$$SiCl_2 + H_2 + Si \rightarrow 2HCl \quad (4)$$

The above reactions may be used in the production of a relatively pure silicon or may be used in the deposition of silicon upon a substrate, such as graphite.

As is obvious from reactions (3) and (4), not all of the silicon present in the gaseous streams of hydrogen and silicon hydrides or silicon halohydrides will be deposited during the high temperature vapor deposition. While in most vapor deposition techniques only 5–10 percent (on a mole basis) of the silicon contained in the gaseous stream charged to a deposition zone is deposited as relatively pure silicon, it has been common to treat the exiting gas stream as a waste stream rendering the deposition of silicon relatively expensive.

In an attempt to lower the expense of the vapor depositing silicon, it has been proposed that some of the silicon halide and silicon halohydrides be scrubbed from the $H_2$ stream and the $H_2$ repurified in a subsequent step.

2

The equipment for scrubbing the gas stream exiting from the deposition zone and repurifying the components scrubbed from the stream is also expensive and overlooks the fact that the gases exiting from the deposition zone are relatively pure and have been only slightly changed in concentration from the input condition. The present invention is directed to a method for reconstituting the concentration of a component deposited from a gas stream so that the stream may be reused, thus reducing the expense of the deposition procedure.

The present invention may be generally described as a method for reconstituting the concentration of a component in a gas stream after deposition of the component from the stream which comprises the steps of passing a gaseous mixture of $YH_aX_b$ and $H_2$ from which Y has been deposited at an elevated temperature through a porous bed of Y. The temperature and pressure of the gas while it passes through the bed of Y is regulated to permit etching of Y from the bed by the gas stream and the stream thus enriched with Y is discharged from the bed for reuse. Y is selected from the class consisting of silicon, chromium, titanium, zirconium, and vanadium, X is a halogen, the subscript $b$ is an integer representing the number of halogen atoms needed to form the compound, and the subscript $a$ is an integer designating the number of hydrogen atoms in the molecule. With chromium, titanium, zirconium and vanadium, the subscript $a$ will be 0, and $b$ will assume a value compatible with the valence of the metallic element in the compound. When Y is silicon $a+b=4$. To be more specific, reference is made to the drawings, in which:

FIG. 1 is a schematic diagram of suitable apparatus for carrying out the invention;

FIG. 2 is an enlarged diagrammatic illustration of the reactor of FIG. 1; and

FIG. 3 is an enlarged diagrammatic cross-sectional view of a bed suitable for reconstituting the concentration of the particular component in the gas stream.

In FIG. 1, hydrogen ($H_2$) is introduced through adjustable valve 4, to which a conventional pressure gauge 10 may be attached, into a conventional deoxygenizing purifier 5. From purifier 5, the hydrogen passes through volumetric measuring flow meter 6, and from flow meter 6 the hydrogen discharges through valve 7 into the bottom of saturator 8. The upper portion of saturator 8 communicates through valve 9 in conduit 11 with the bottom of reactor 12. The top of reactor 12 is in joint communication with conduits 13 and 14, conduit 14 of which discharges through manostat 15 and valve 16 to a suitable exhaust conduit 17. The pressure in the system illustrated in FIG. 1 is controlled by manostat 15 and monitored by a pressure gauge 18 in communication with conduit 14.

Conduit 13 communicates through a valve 19 with an etch bed 21 which is thermally controlled by an external power source 39. Etch bed 21 through conduit 23 communicates with a pump 24 which discharges through a two-way valve 25 into conduits 11 and 41. Conduit 11, as explained before, communicates with the bottom of reactor 12, and conduit 41 serves as an exhaust conduit.

Reactor 12 is more clearly illustrated in FIG. 2, to which reference is now made. Reactor 12 comprises a cylindrical container which forms a gas-tight cylindrical chamber 26. Supported within chamber 26 is a cylindrical slotted graphite heater 27 connected across conductors 28 and 29. Conductors 28 and 29 are in turn connected across a conventional variable current source 31 to heat a specimen 32, such as graphite, which is supported upon a three-pronged base 33.

Etch bed 21 is more clearly illustrated in FIG. 3, to which reference is here made. Etch bed 21 comprises an elongated, horizontal, cylindrical tube 34 which is filled with a particulate material 35, such as one-quarter inch diameter silicon particles. Surrounding shell 34 is a conventional heating mantle 36 connected by conductors 37 and 38 across a variable current source 39. Shell 34 is provided with a thermocouple 43 connected to a conventional temperature chart (not illustrated) to permit monitoring of the temperature in etch bed 21. Communication through etch bed 21 is provided by conduits 20 and 23 communicating with either end thereof.

EXAMPLE 1

The equipment illustrated in FIGS. 1–3 is utilized. A cylindrical-shaped graphite body having a density of 1.6 gms./cm.³ is suspended on base 33. The body is raised to about 1000° C. by impressing a suitable potential across conductors 28 and 29. The etch bed 21 is raised to 800° C. and all valves opened, with valve 25 being opened to direct gases through conduit 41. About 7.5 liters per minute of hydrogen is bubbled through saturator 8 which is filled with silicon tetrachloride until all air is purged from the system. When air has been purged from the system, valves 4, 7, 9 and 16 are closed, and valve 25 turned to direct fluid flow through conduit 11 so that pump 24 serves to circulate gases in the system. A bypass line around saturator 8 can be provided for purging the system with hydrogen before introducing the silicon tetrachloride and hydrogen mixture, which is preferred, but not necessary. The gaseous mixture of silicon tetrachloride and hydrogen, which contains about 5–9 mole percent silicon tetrachloride, is circulated through reactor 12 to deposit a layer of relatively pure silicon on graphite specimen 32. Pressure of the mixed stream of silicon tetrachloride and hydrogen is maintained at one atmosphere, and the stream, after deposition of the silicon in reactor 12, which may be termed a deposition zone, is circulated through conduit 13 and bed 21 by pump 24 before being returned to the bottom of reactor 12. Etch bed 21 is maintained at about 800° C. during circulation of the exhaust stream from the reactor 12 therethrough.

From equilibrium data for silicon-halide-hydrogen systems, such as that disclosed by Lever, "The Equilibrium Behavior of the Silicon-Hydrogen-Chlorine System," page 460, IBM Research Journal (September 1964), it has been determined that a gaseous stream of silicon tetrachloride and hydrogen in the concentration indicated above will deposit silicon from the stream at temperatures between about 900° C. and 1300° C. Conversely, the equilibrium of the gas system is such that a 800° C. the gaseous stream is unstable due to a lack of silicon and will etch, i.e., pick up, silicon from bed 21 reconstituting the concentration of silicon in the gaseous stream. The etching of silicon from bed 21 will not occur as rapidly as the deposition of silicon from the gaseous stream deposition zone of reactor 12, therefore bed 21 is preferably constructed so that the dwell time of the gaseous stream in bed 21 is between ten and twenty times as great as the dwell time of the gaseous stream in reactor 12. It is also preferably if the temperature drop in the lines leading from and into reactor 12 be maintained at less than 40° C. per inch to prevent the solidification of gaseous silicon polymers in the streams exiting and entering reactor 12, and the reactor and conduits may be provided with suitable insulation (not illustrated). If a pump 24, having working surfaces of Teflon, for example, is used, it will be necessary to provide sufficient conduit to permit cooling of the gaseous stream to approximately 200° C. or less.

While silicon tetrachloride is a preferred source of silicon, deposition of silicon can be effected by use of other silicon halides, which term is used to include silicon-halo-hydride compounds.

While silicon fluorides (which term is used to include silicon-hydrogen-fluorine compounds) may be used, they are not preferred because of their low heat of reaction. Also, silicon iodides (which term is used to include silicon-hydrogen-iodine compounds) may be used, but they are not preferred because of their low vapor pressure. Other than silicon tetrachloride, the preferred silicon halides include trichlorosilane ($SiHCl_3$), dichlorosilane ($SiHCl_2$), silicon dichloride ($SiCl_2$), silicon tetrabromide ($SiBr_4$), tribromosilane ($SiH_3Br$), dibromosilane ($SiH_2Br_2$), and silicon dibromide ($SiBr_2$). Silicon dibromide and silicon dichloride only exit at higher temperatures and may be used to obtain faster deposition of silicon than obtainable with the other mentioned silicon bromides and chlorides (which terms are used to include silicon-hydrogen-bromide and silicon-hydrogen-chlorine compounds, respectively). The various halides which are useful in the present invention may be generally identified by the formula:

$$YH_aX_b, \text{ as described above}$$

The present invention, as illustraed in Example 1, thus provides a system which once charged with a gaseous deposition stream may utilize the exhaust stream from reactor 12 and etch bed 21 to reconstitute the concentration of the component deposited from the stream for reuse in the reactor. As is obvious, such a system is more economical than one which either exhaust the gaseous stream to the atmosphere or exhausts the stream to suitable purification equipment. While the equipment illustrated utilizes a reactor designed for the deposition of silicon on a body such as graphite, the invention is not limited to such a system, but may be utilized in any system where the deposition of silicon is desired, or where one of the other materials mentioned above is to be deposited.

With any given halide having the general formula $YH_aX_b$, the equilibrium data for the halide may be easily calculated by techniques such as those used by Lever, "The Equilibrium Behavior of the Silicon-Hydrogen-Chlorine System," page 460, IBM Research Journal (September 1964), to determine the temperature at which deposition may most readily be effected, and the temperature at which the etch bed 21 must be maintained. If a vanadium halide, for example, is used in the system illustrated in FIGS. 1–3, the etch bed 21 would, of course, be provided with a plurality of vanadium particles. Etch bed 21 preferably includes particles of relatively large diameter, such as one-quarter inch, to minimize the pressure drop across the bed, thus minimizing the size of pump 24, which may be any positive-displacement type pump constructed of Teflon or a mild steel.

What is claimed is:

1. A method for the vapor deposition of silicon comprising:
    forming a gaseous stream comprising hydrogen and a silicon compound selected from the group consist- of silicon tetrachloride and a silicon chlorohydride;
    passing said stream through a deposition zone maintained at silicon-depositing conditions;
    passing the effluent gases from said zone through a bed of silicon particles maintained at silicon-etching conditions thereby reconstituting said stream; and
    recycling the reconstituted stream through said deposition zone.

2. The method of claim 1, wherein the dwell time of said gaseous stream in said silicon bed is between about 10 and 20 times as long as the time over which deposition of silicon from said stream was effected.

3. The method of claim 1, wherein said silicon was deposited from a saturated stream of a silicon tetrachloride and hydrogen at a temperature between 900° C. and 1300° C. and at one temperature, and said bed of silicon particles is maintained at about 800° C.

4. A method for the vapor deposition of silicon comprising:
   forming a gaseous stream comprising hydrogen and about 5–9 mol percent silicon tetrachloride;
   passing said stream in contact with a substrate maintained at silicon-depositing conditions including a temperature between about 900° C. and 1300° C.;
   passing the effluent gases from the deposition zone through a bed of particulate silicon maintained at silicon-etching conditions including a temperature of about 800° C., thereby reconstituting said stream; and
   recycling the reconstituted stream to said deposition zone.

5. A method as defined by claim 4 wherein the dwell time of said effluent gases in contact with said particulate silicon is between 10 and 20 times as great as the dwell time of the gaseous stream in said deposition zone.

References Cited
UNITED STATES PATENTS

| | | | |
|---|---|---|---|
| 2,805,133 | 9/1957 | Olson | 23—223.5 |
| 2,840,489 | 6/1958 | Kempter et al. | |
| 2,856,312 | 10/1958 | Nowak et al. | 117—102 X |
| 2,887,407 | 5/1959 | Koch | 117—107.2 |
| 3,091,517 | 5/1963 | Short et al. | 23—223.5 X |

OTHER REFERENCES

Lever, IBM Journal of Research and Development, vol. 8, 1964, pp. 460 to 465 relied upon.

ALFRED L. LEAVITT, Primary Examiner

U.S. Cl. X.R.

117—106, 107.2; 148—174; 156—17